(12) United States Patent
Agron

(10) Patent No.: US 12,131,159 B2
(45) Date of Patent: Oct. 29, 2024

(54) ISA OPCODE PARAMETERIZATION AND OPCODE SPACE LAYOUT RANDOMIZATION

(71) Applicant: Intel Corporation, Santa Clara, CA (US)

(72) Inventor: Jason Agron, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 719 days.

(21) Appl. No.: 17/128,799

(22) Filed: Dec. 21, 2020

(65) Prior Publication Data

US 2022/0197658 A1  Jun. 23, 2022

(51) Int. Cl.
*G06F 9/30* (2018.01)
*G06F 9/38* (2018.01)
*G06F 21/12* (2013.01)

(52) U.S. Cl.
CPC ........ *G06F 9/3818* (2013.01); *G06F 9/30101* (2013.01); *G06F 9/30145* (2013.01); *G06F 9/3802* (2013.01); *G06F 21/125* (2013.01)

(58) Field of Classification Search
CPC .............. G06F 9/3818; G06F 9/30101; G06F 9/30145; G06F 9/3802; G06F 21/125
See application file for complete search history.

(56) References Cited

U.S. PATENT DOCUMENTS

| | | | |
|---|---|---|---|
| 6,675,298 B1 | 1/2004 | Folmsbee | |
| 10,515,215 B2 * | 12/2019 | Guri | G06F 21/562 |
| 11,361,070 B1 * | 6/2022 | Rabinovich | G06F 9/30156 |
| 2002/0016918 A1 * | 2/2002 | Tucker | G06F 21/602 |
| | | | 380/42 |
| 2009/0106540 A1 * | 4/2009 | Haid | G06F 9/30145 |
| | | | 712/E9.035 |
| 2012/0159193 A1 * | 6/2012 | Spradlin | G06F 21/79 |
| | | | 713/190 |
| 2015/0039864 A1 * | 2/2015 | Tobin | G06F 21/56 |
| | | | 712/220 |
| 2017/0177504 A1 | 6/2017 | Desai et al. | |

OTHER PUBLICATIONS

Extended European Search Report from European Patent Application No. 21195419.3 notified Jan. 31, 2022, 9 pgs.
Office Action from European Patent Application No. 21195419.3 notified Jul. 3, 2024, 6 pgs.

* cited by examiner

*Primary Examiner* — Corey S Faherty
(74) *Attorney, Agent, or Firm* — Essential Patents Group, LLP

(57) ABSTRACT

An embodiment of an apparatus may comprise a memory to store configuration information, an instruction decoder to decode an instruction having one or more fields including an opcode field, and circuitry communicatively coupled to the instruction decoder and the memory, the circuitry to determine if an opcode value in the opcode field of the instruction corresponds to an altered opcode value in the stored configuration information that correlates one or more altered opcode values with respective original opcode values, and, if so determined, decode the instruction based on one of the original opcode values correlated to the altered opcode value in the stored configuration information. Other embodiments are disclosed and claimed.

14 Claims, 16 Drawing Sheets

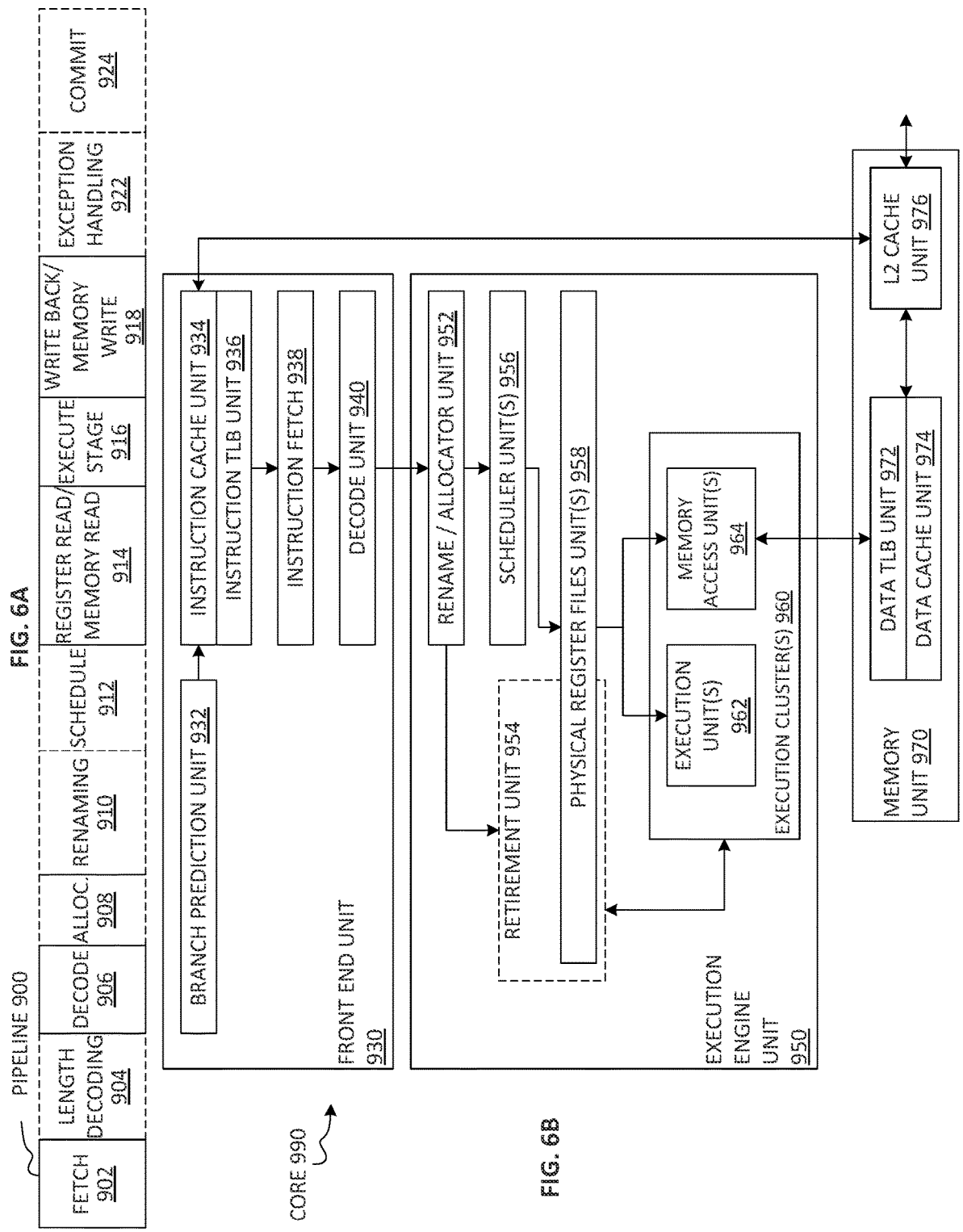

ISA OPCODE PARAMETERIZATION AND OPCODE SPACE LAYOUT RANDOMIZATION

BACKGROUND

1. Technical Field

This disclosure generally relates to processor technology, and instruction decode technology.

2. Background Art

Program-hardening techniques at the instruction set architecture (ISA) level generally involve privilege restrictions (e.g., page permissions for R/W/X/etc.) and/or control flow integrity (e.g., limiting the ability of a program to perform arbitrary control flow with respect to a set of pre-set rules). Permissions-based restrictions, while effective, still leave a program that can be interpreted and exploited by malware. The actual program content/representation is well-known and can be used against itself (e.g., via return oriented programming (ROP), jump oriented programming (JOP), etc.). Control flow integrity mechanisms, while effective to reduce the ability for malware to exploit and use arbitrary parts of the program with unlimited flexibility, still leave a program with well-known content/representation that can be interpreted and exploited by malware.

BRIEF DESCRIPTION OF THE DRAWINGS

The various embodiments of the present invention are illustrated by way of example, and not by way of limitation, in the figures of the accompanying drawings and in which:

FIG. 6A is a block diagram illustrating both an exemplary in-order pipeline and an exemplary register renaming, out-of-order issue/execution pipeline according to embodiments of the invention.

FIG. 6B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
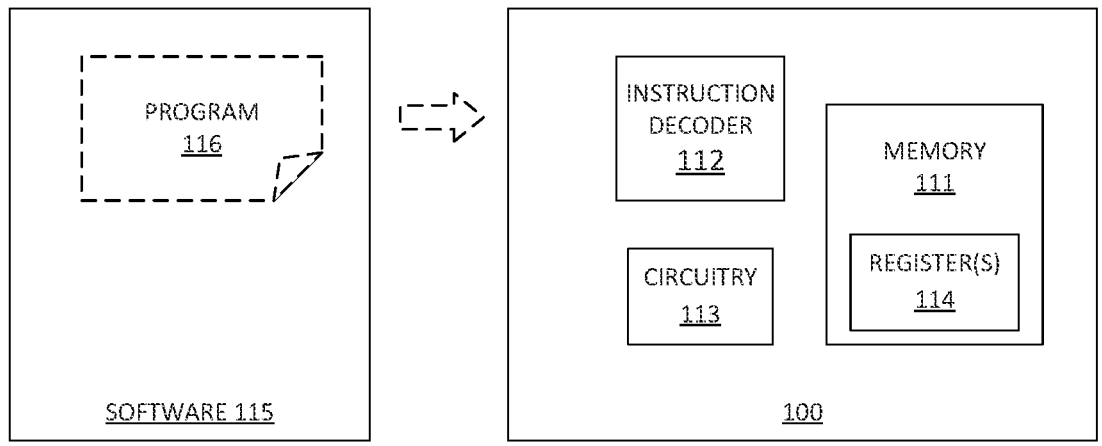
FIG. 1 is a block diagram of an example of an apparatus according to an embodiment.

Embodiments discussed herein variously provide techniques and mechanisms for instruction decode. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to decode instructions. For example, embodiments may be implemented in processing elements of electronic devices such as a central processing unit (CPU), a graphics processing unit (GPU), etc.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

With reference to FIG. 1, an embodiment of an apparatus 100 may include memory 111 to store configuration information, an instruction decoder 112 to decode an instruction having one or more fields including an opcode field, and circuitry 113 communicatively coupled to the instruction decoder 112 and the memory 111. The circuitry 113 may be configured to determine if an opcode value in the opcode field of the instruction corresponds to an altered opcode value in the stored configuration information that correlates one or more altered opcode values with respective original opcode values, and, if so determined, the circuitry 113 may be further configured to decode the instruction based on one of the original opcode values correlated to the altered opcode value in the stored configuration information. For example, an instruction which used to be conveyed to the hardware via an original opcode, may now be conveyed to the hardware using the altered opcode. In some embodiments, the circuitry 113 may be further configured to store random opcode values in the configuration information for the one or more altered opcode values, and correlate a respective original opcode value to each of the random opcode values in the stored configuration information.

Some embodiments may further include software 115 to alter instruction-level encoded content of a program 116 at load time to substitute altered opcode values for the correlated original opcode values from the stored configuration information. For example, the software 115 may be configured to add the configuration information to a context of the program 116 to make the program 116 and configuration information portable. In some embodiments, the software 115 may be further configured to generate a first set of random opcode values in the configuration information for a first instance of the program 116, and generate a second set of random opcode values, different from the first set, in the configuration information for a second instance of the program 116. For example, the software 115 may also be configured to restrict the random opcode values in the configuration information to values that avoid conflict with a pre-determined non-mutable instruction pattern. In some embodiments, the software 115 may comprise operating system (OS) code such as a loader, a patching layer, etc.

In some embodiments, the memory 111 may include one or more programmable system registers 114 to store the configuration information. The registers 114 may include N configurable registers, which may be re-programmed with alternate opcode settings. For example, the registers 114 may be connected to the instruction decoder 112, and when activated, each register value may be used for instruction determination instead of a fixed pattern. In some embodiments, the programmable system registers 114 may have multiple copies in order to support multiple logical processors per central processor unit (CPU) core (e.g., a CPU core may contain two logical processors, each of which would have their own independent set of registers).

Figure 11:
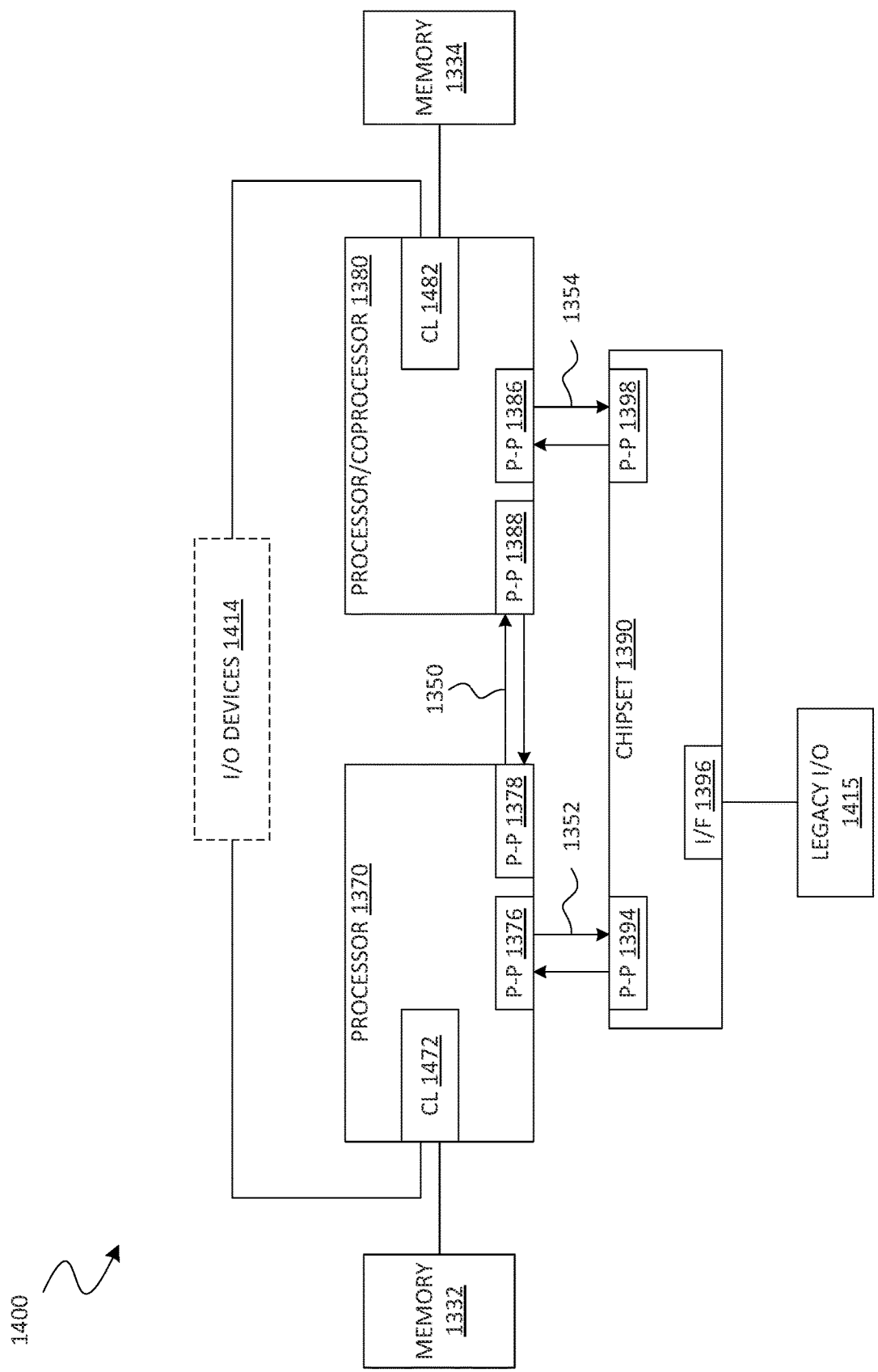
Figure 12:
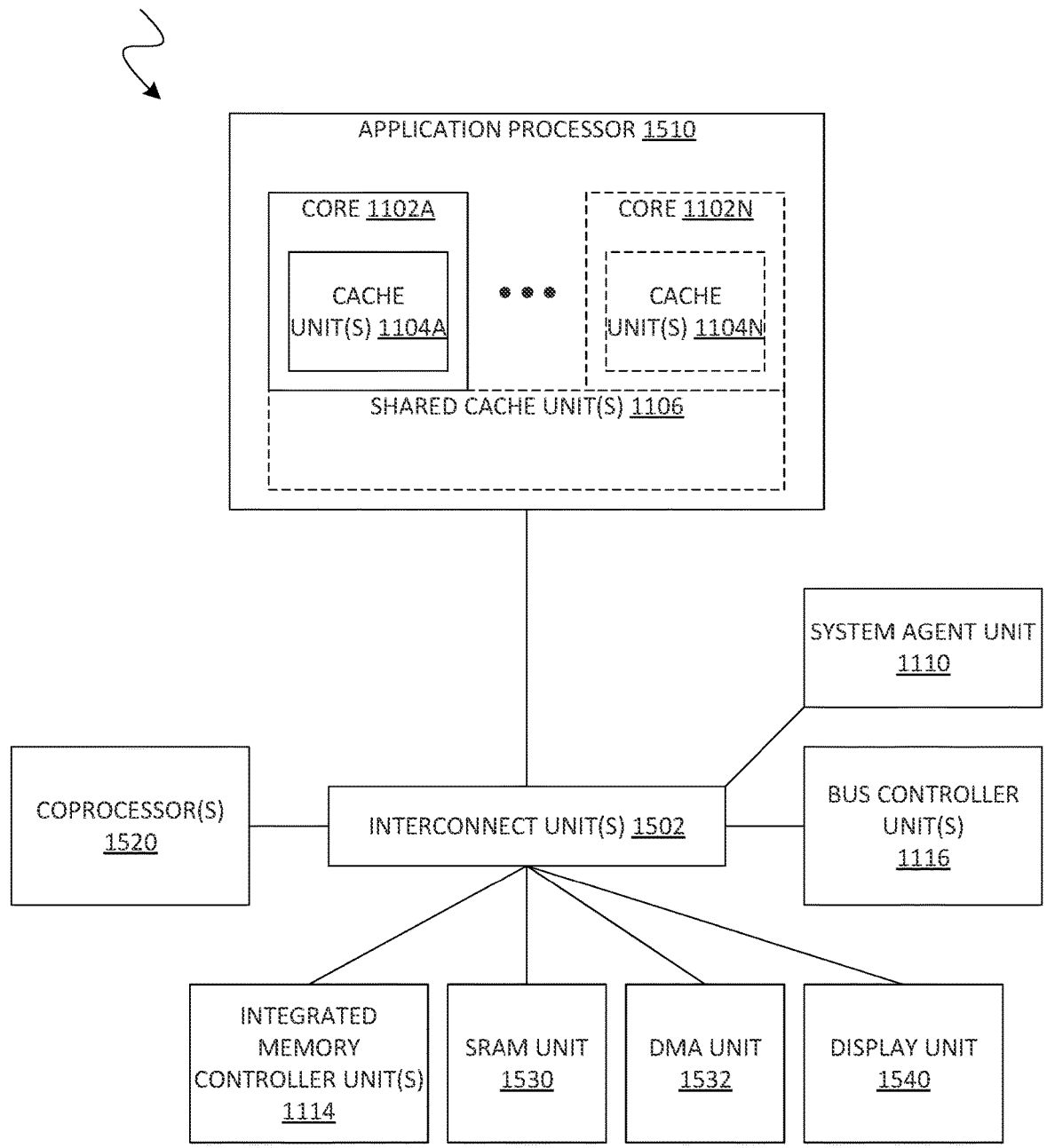
Figure 13:
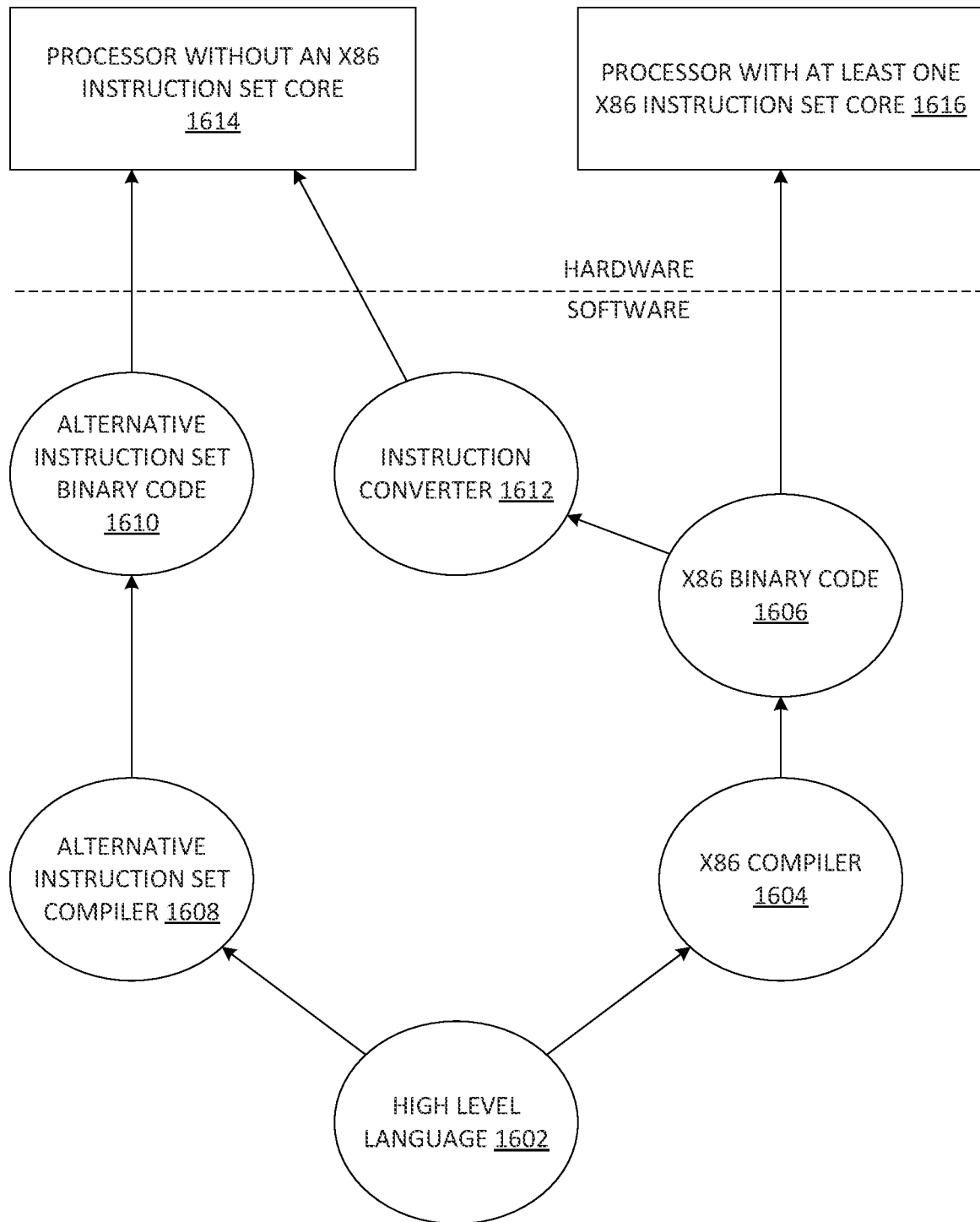
FIG. 13 is a block diagram contrasting the use of a software instruction converter to convert binary instructions in a source instruction set to binary instructions in a target instruction set according to embodiments of the invention.

Embodiments of the memory 111, instruction decoder 112, the circuitry 113, and/or the registers 114 may be incorporated in a processor including, for example, the core 990 (FIG. 6B), the cores 1102A-N (FIGS. 8, 12), the processor 1210 (FIG. 9), the co-processor 1245 (FIG. 9), the processor 1370 (FIGS. 10-11), the processor/coprocessor 1380 (FIGS. 10-11), the coprocessor 1338 (FIGS. 10-11), the coprocessor 1520 (FIG. 12), and/or the processors 1614, 1616 (FIG. 13). In particular, embodiments of the circuitry 113 and/or the registers 114 may be incorporated in the decode unit 940 (FIG. 11B).

Figure 2A:
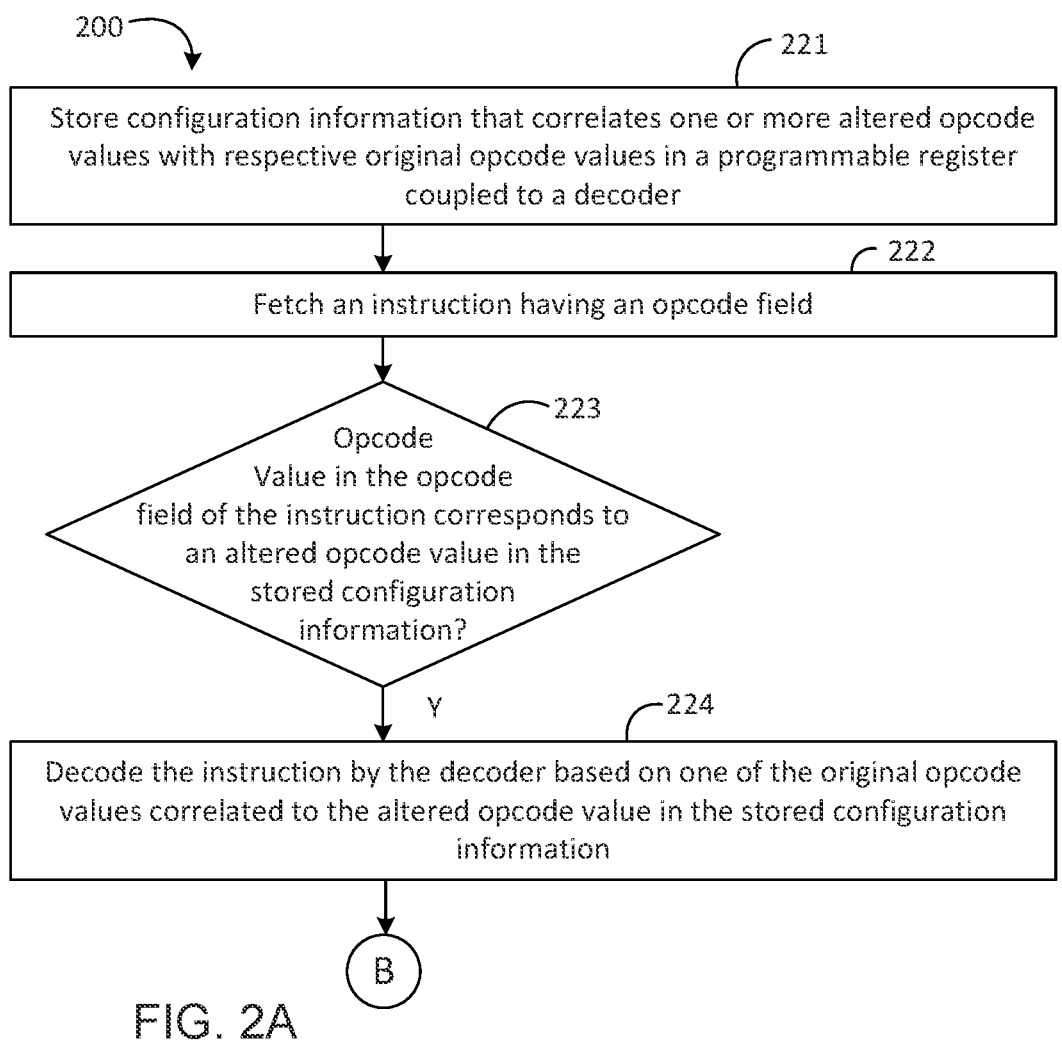
FIGS. 2A to 2B are flow diagrams of an example of a method according to an embodiment.
Figure 2B:
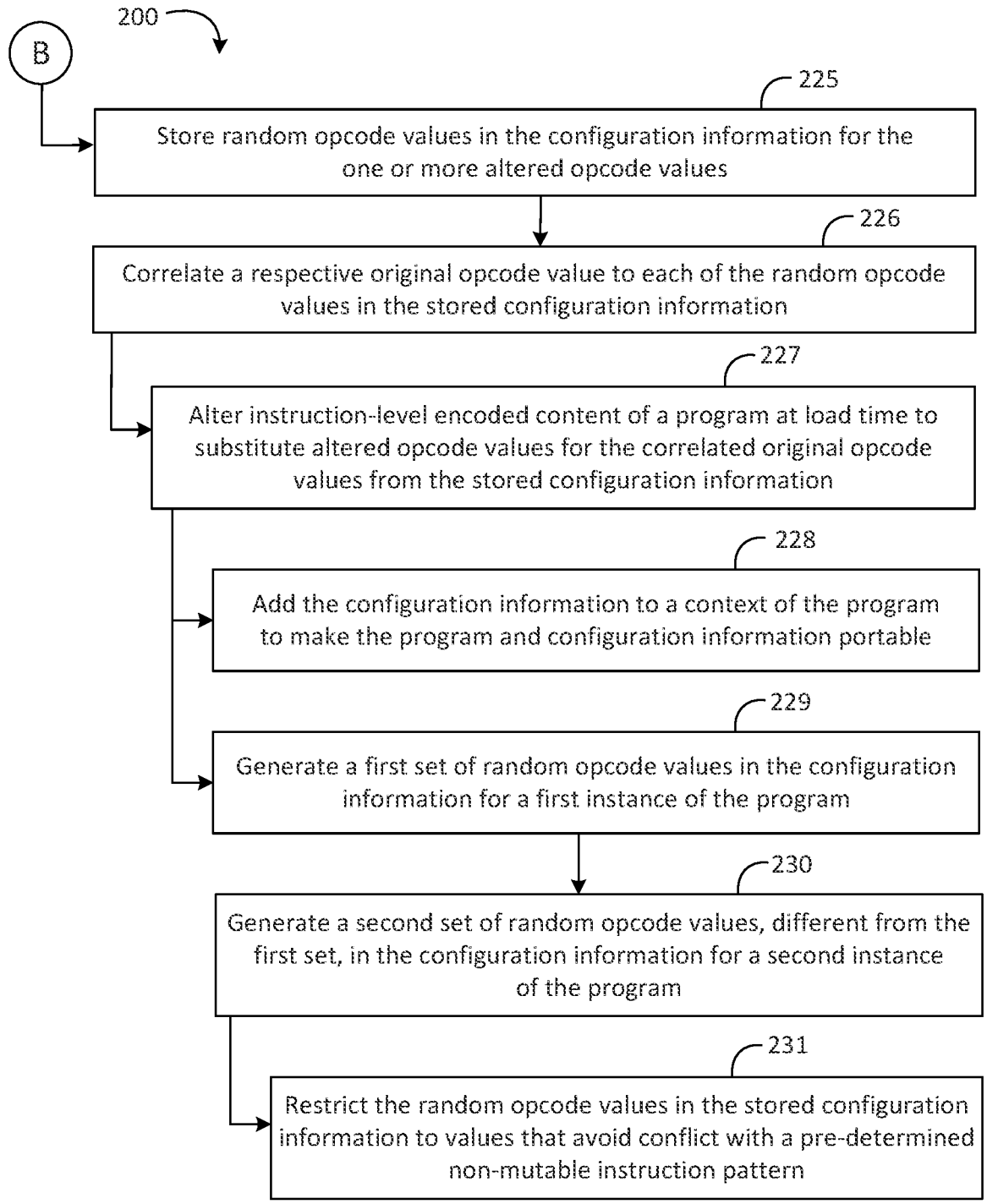

With reference to FIGS. 2A to 2B, an embodiment of a method 200 may include storing configuration information that correlates one or more altered opcode values with respective original opcode values in a programmable register coupled to a decoder at box 221, fetching an instruction having an opcode field at box 222, determining if an opcode value in the opcode field of the instruction corresponds to an altered opcode value in the stored configuration information at box 223, and, if so determined, decoding the instruction by the decoder based on one of the original opcode values correlated to the altered opcode value in the stored configuration information at box 224. Some embodiments of the method 200 may further include storing random opcode values in the configuration information for the one or more altered opcode values at box 225, and correlating a respective original opcode value to each of the random opcode values in the stored configuration information at box 226.

Some embodiments of the method 200 may further include altering instruction-level encoded content of a program at load time to substitute altered opcode values for the correlated original opcode values from the stored configuration information at box 227. For example, the method 200 may include adding the configuration information to a context of the program to make the program and configuration information portable at box 228. For example, portability may involve including the configuration information as part of a thread and process context, which allows the configuration information to automatically follow the program as the program is paused and resumed, context switched, or even migrated amongst CPUs. Some embodiments of the method 200 may further include generating a first set of random opcode values in the configuration information for a first instance of the program at box 229, and generating a second set of random opcode values, different from the first set, in the configuration information for a second instance of the program at box 230. The method 200 may also include restricting the random opcode values in the stored configuration information to values that avoid conflict with a pre-determined non-mutable instruction pattern at box 231. For example, embodiments of operations in boxes 227 through 231 may be performed by OS code such as a loader, a patching layer, etc.

Figure 3:
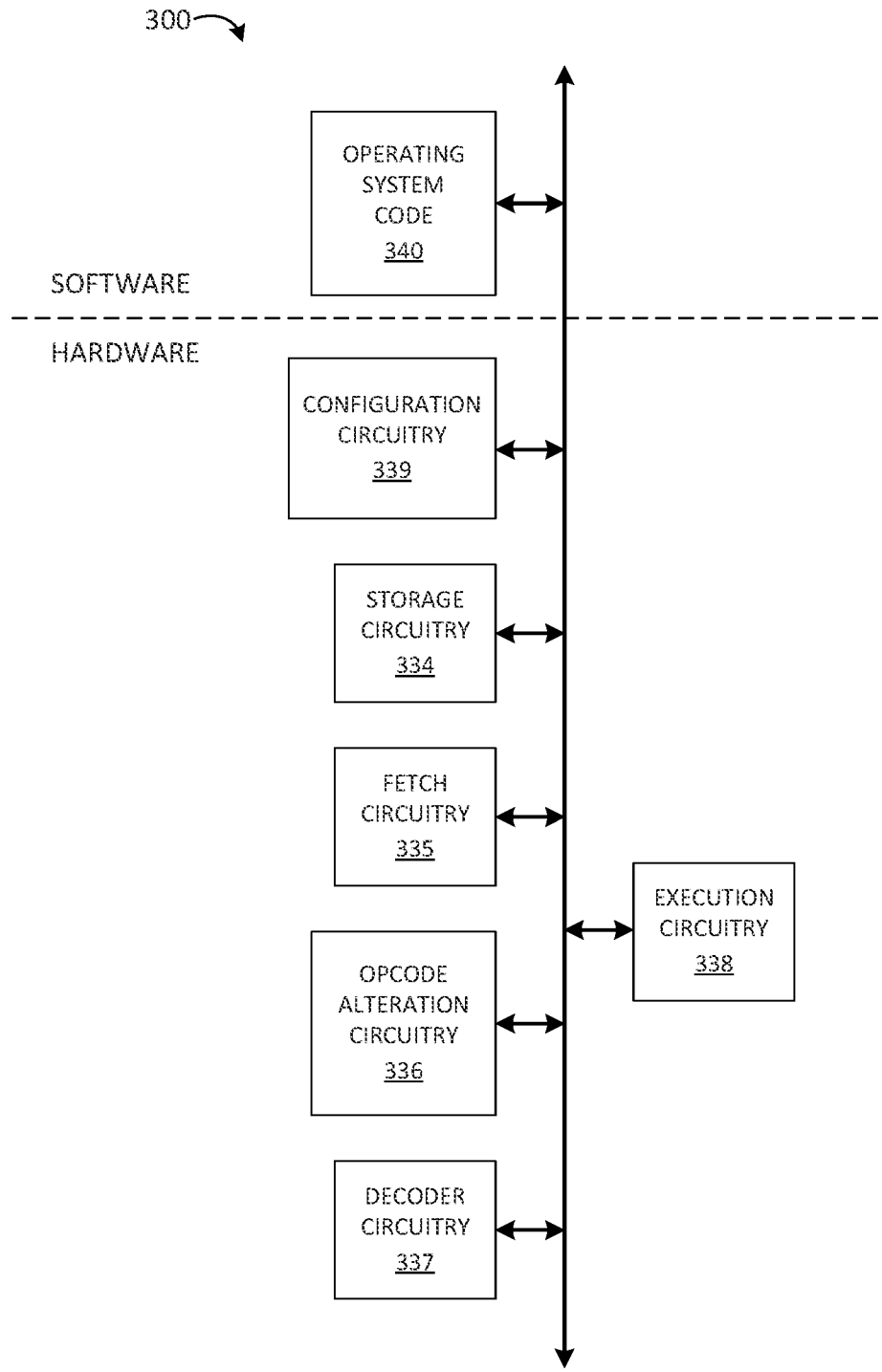
FIG. 3 is a block diagram of an example of an apparatus according to an embodiment.

With reference to FIG. 3, an embodiment of an apparatus 300 may include storage circuitry 334 to store configuration information that correlates one or more altered opcode values with respective original opcode values (e.g., prior to instruction decode), fetch circuitry 335 to fetch a single instruction, the single instruction to include an opcode field, and opcode alteration circuitry 336 communicatively coupled to the storage circuitry 334 and the fetch circuitry 335 to determine if an opcode value in the opcode field of the single instruction corresponds to an altered opcode value in the stored configuration information and, if so determined, to substitute one of the original opcode values correlated to the altered opcode value in stored configuration information for the altered opcode value. For example, an instruction which used to be conveyed to the hardware via an original opcode, may now be conveyed to the hardware using the altered opcode. The apparatus 300 may further include decoder circuitry 337 communicatively coupled to the opcode alteration circuitry 336 to decode the single instruction based on the opcode value that results from the opcode alteration circuitry 336, and execution circuitry 338 communicatively coupled to the decoder circuitry to execute the decoded instruction. Some embodiments of the apparatus 300 may further include configuration circuitry 339 communicatively coupled to the storage circuitry 334 to store random opcode values in the configuration information for the one or more altered opcode values and correlate a respective original opcode values to each of the random opcode values in the stored configuration information. For example, the single instruction fetched by the fetch circuitry 335 may further include a field for an identifier of a first source operand to identify one of a vector register and a memory location.

The apparatus 300 may further include operating system (OS) code 340 configured to alter instruction-level encoding content of a program at load time to substitute altered opcode values for the correlated original opcode values from the configuration information. For example, OS code 340 may be configured to add the configuration information to a context of the program to make the program and configuration information portable. In some embodiments, the OS code 340 may be further configured to generate a first set of random opcode values in the configuration information for a first instance of the program, and generate a second set of random opcode values, different from the first set, in the configuration information for a second instance of the program. For example, the OS code 340 may be configured to restrict the random opcode values stored in the configuration information to values that avoid conflict with a pre-determined non-mutable instruction pattern.

In some embodiments, a typical flow for an instruction would start with the fetch circuitry 335 fetching the instruction, the decoder circuitry 337 decoding the fetched instruction, and the execution circuitry 338 executing the decoded instruction. Advantageously, the operation of the decoder circuitry 337 is augmented by the storage circuitry 334, the opcode alteration circuitry 336, and the configuration circuitry 339. In some embodiments, one or more of the storage circuitry 334, the opcode alteration circuitry 336, and the configuration circuitry 339 and may co-located in a same hardware block as the decode circuitry 337.

Embodiments of the storage circuitry 334, fetch circuitry 335, opcode alteration circuitry 336, decoder circuitry 337, execution circuitry 338, and/or the configuration circuitry 339 may be incorporated in a processor including, for example, the core 990 (FIG. 6B), the cores 1102A-N (FIGS. 8, 12), the processor 1210 (FIG. 9), the co-processor 1245

(FIG. 9), the processor 1370 (FIGS. 10-11), the processor/coprocessor 1380 (FIGS. 10-11), the coprocessor 1338 (FIGS. 10-11), the coprocessor 1520 (FIG. 12), and/or the processors 1614, 1616 (FIG. 13). In particular, embodiments of the opcode alteration circuitry 336, decoder circuitry 337, and/or the configuration circuitry 339 may be incorporated in the decode unit 940 (FIG. 11B).

Some embodiments provide technology for instruction set architecture (ISA) opcode parameterization. For example, some embodiments provide technology for wildcard opcodes and/or opcode space layout randomization (OSLR). Program exploits are often directed using architecture-specific techniques which tamper and make use of existing program code and logic to carry out malicious/un-intended actions. Malware and exploits may take advantage of well-known, standardized facts about classes of central processor units (CPUs) (e.g., x86, ARM, PowerPC, MIPS, etc.) when crafting these attacks as a program that runs on a particular type of machine is conventionally configured to use a specific binary encoding of various ISA features. Some attacks may be well positioned to work given the fact that all programs for a particular architecture are targeting a fixed/stable set of ISA encodings.

Most conventional program hardening techniques seek to restrict program behaviors, rather than alter program representations. Control flow integrity mechanisms have a dynamic overhead (e.g., shadow stack maintenance, ENDBRANCH execution checking, etc.) that penalized runtime execution. There are also techniques which seek to encrypt/transform disk/memory images of programs. Once program code is fetched, however, the code is often in plain-text form, and represented by stable and well-documented ISA encodings that can be attacked. Encrypted code schemas are effective for protecting an image against external observers/attackers, but at run-time such schemas still leave a well-known/stable program that can be interpreted and exploited by malware. Address-space layout randomization (ASLR) refers to an architecture independent hardening technique that seeks to alter where programs live at load-time/run-time in order to make exploits that assume fixed address layouts from being as effective.

Some embodiments may allow a program, at load-time, to vary its instruction-level encoding content via wildcard opcodes and/or OSLR, advantageously providing some amount of hardening to thwart exploits which seek to exploit a fixed/stable set of ISA encodings. For example, a program, at load-time, may configure the hardware to communicate that a given fixed set of ISA features is re-encoded in a specific way (e.g., using an opcode map configuration) that potentially differs from all other programs (e.g., both in the machine and across platforms). The program may then utilize an OSLR patch program to convert the program's binary program to adopt the chosen opcode map, which customizes the program to use the new encodings that are now understood by the hardware for this particular program. Embodiments of OSLR technology alter/randomize opcode values at load-time/run-time in order to make exploits that assume fixed opcode values less effective.

The program and its opcode map configuration may be considered portable in that the configuration is part of the program's context. Accordingly, the opcode map configuration travels with the program as the program migrates and context switches throughout a computing system. Any attacker/exploit that attempts to tamper with the program will be mitigated to the extent that the opcode map configuration chosen by the program differs from what the attacker has expected/assumed. Advantageously, the level of protection provided by some embodiments doesn't have a penalizing run-time overhead that is inherent in other control flow integrity protection schemas, or sandboxing schemas.

In some embodiments, wildcard opcodes and OSLR allow for programs to mutate their executable representations in ways that make the programs resistant to attacks/tampering that seek to exploit standardized ISA encodings. The mutation technique allows for a program to alter its representation while still remaining executable, even in the face of context switches/migration, and other programs which may use alternate encodings/mutations. In some embodiments, OSLR uses program representation mutation to thwart attacks which require specific assumptions about ISA content and representation. Advantageously, embodiments may be utilized by processors that support OSLR to protect sensitive ISA features (e.g., indirect control flow, sensitive instructions, etc.). In accordance with some embodiments, the software ecosystem may produce mutated programs that are more secure to attacks/exploits that require understanding specific ISA encodings at run-time.

The degree of mutability need not be overly high to have a high impact. In some embodiments, a select (fixed) set of ISA features that are typically used to exploit a given CPU architecture may be all that is needed to make OSLR effective. Additionally, the degree of flexibility of OSLR need not require changes to both instruction length decode and opcode selection. In some embodiments, changes may be limited to opcode selection in order to simplify OSLR hardware implementations. Additionally, the wildcard settings of the OSLR configuration may be restricted to prevent a software configuration from creating conflicts with existing, non-mutable instruction patterns. The checking of overlap between wildcarded instructions and fixed/non-mutable instructions need not be in hardware, and may be performed by a program that checks for exclusivity against the fixed patterns. Applying the restriction outside of the hardware may simplify hardware implementations of OSLR.

In some embodiments, OSLR technology may utilize programmable registers as part of the instruction decode logic of the front end of a CPU. For example, the registers may be programmed to represent a mutated program's usage of particular instructions (e.g., Return, or RET), as opposed to hard-coded immediate values that become embedded in the decoder logic. For example, the decoder logic may be configured to perform register comparisons instead of hard-coded comparisons to fixed binary patterns.

Figure 4:
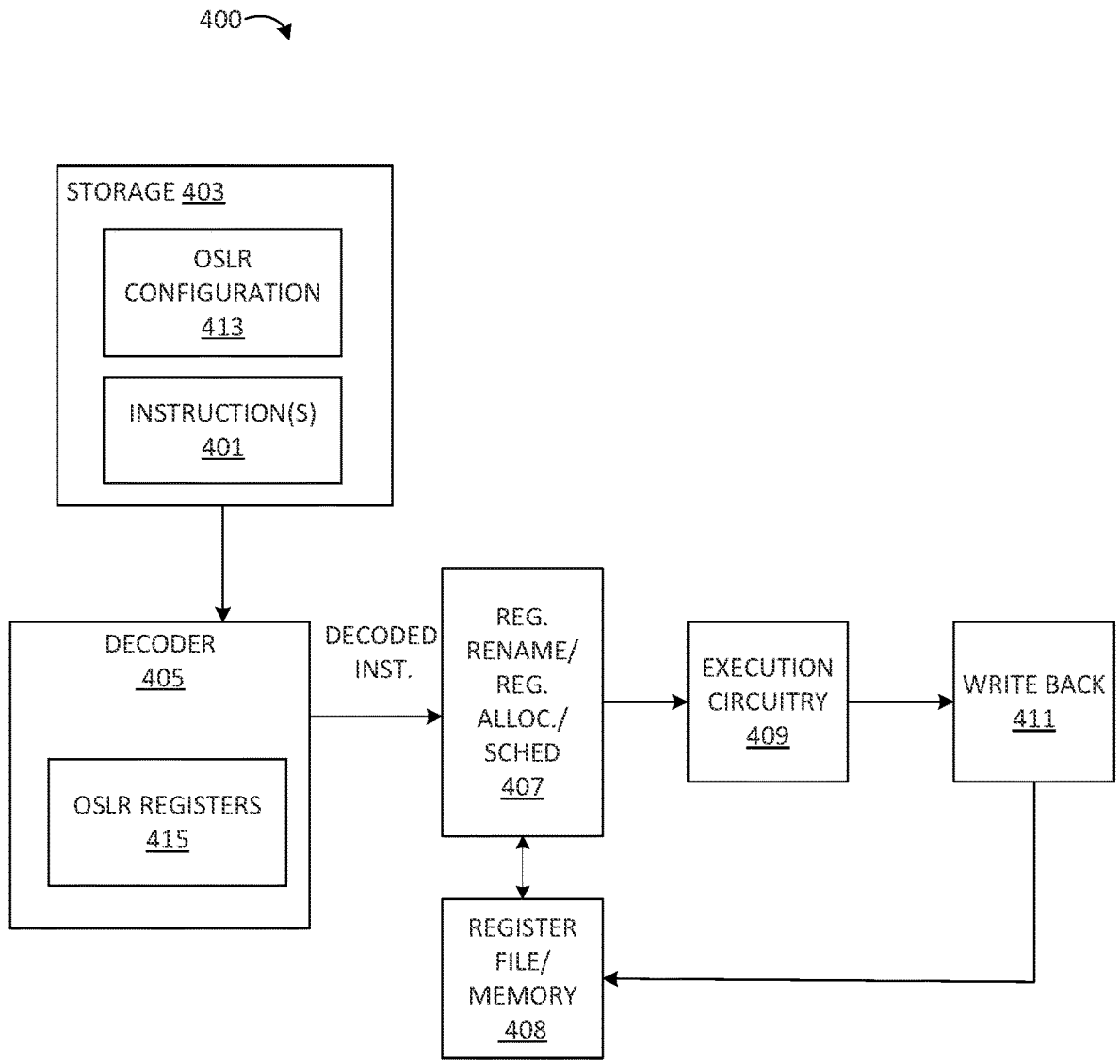
FIG. 4 is a block diagram of an example of hardware according to an embodiment.

FIG. 4 illustrates embodiments of hardware 400 to process a set of instructions 401. As illustrated, storage 403 stores the set of instructions 401 to be executed. An instruction from the set of instructions 401 is received by decode circuitry 405. For example, the decode circuitry 405 receives the instruction from fetch logic/circuitry. The instruction includes fields for an opcode, first and second sources, and a destination. In some embodiments, the sources and destination are registers, and in other embodiments one or more are memory locations. In some embodiments, the opcode details which arithmetic operation is to be performed.

More detailed embodiments of at least one instruction format will be detailed later. The decode circuitry 405 decodes the instruction into one or more operations. In some embodiments, this decoding includes generating a plurality of micro-operations to be performed by execution circuitry (such as execution circuitry 409). The decode circuitry 405 also decodes instruction prefixes.

In some embodiments, register renaming, register allocation, and/or scheduling circuitry 407 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 408 store data as operands of the instruction to be operated on by execution circuitry 409. Exemplary register types include packed data registers, general purpose registers, and floating point registers. Execution circuitry 409 executes the decoded instruction. In some embodiments, retirement/write back circuitry 411 architecturally commits the destination register into the registers or memory 408 and retires the instruction.

An embodiment of a format for an arithmetic recurrence instruction is VXBARARITH DSTREG, SRC1, SRC2. In some embodiments, VXBARARITH{B/W/D/Q} is the opcode mnemonic of the instruction. ARITH may be multiply, add, subtract, divide, etc. DSTREG is a field for the packed data destination register operand. SRC1 and SRC2 are fields for the sources such as packed data registers and/or memory.

The storage 403 may also store an OSLR configuration 413 which is utilized to program OSLR registers 415 in the decoder 405 to represent a program's altered usage of particular opcodes. For example, the decoder 405 may be configured to perform a comparison of the opcode field of the instruction against opcodes stored in the OSLR registers 415 as part of the decode operation. The programmable interface of OSLR allows for specific ISA-level instructions (mnemonics) to be mapped to different concrete opcodes on a per-program basis (and even at run-time if dynamic OSLR re-mapping and re-patching is done). The OSLR configuration 413 of a program must be loaded (e.g., put into place in the OSLR registers 415) into the HW in order for the program to run successfully. Similarly, the program's context (e.g., register state) must be loaded before the program can run, or be resumed.

Figure 5A:
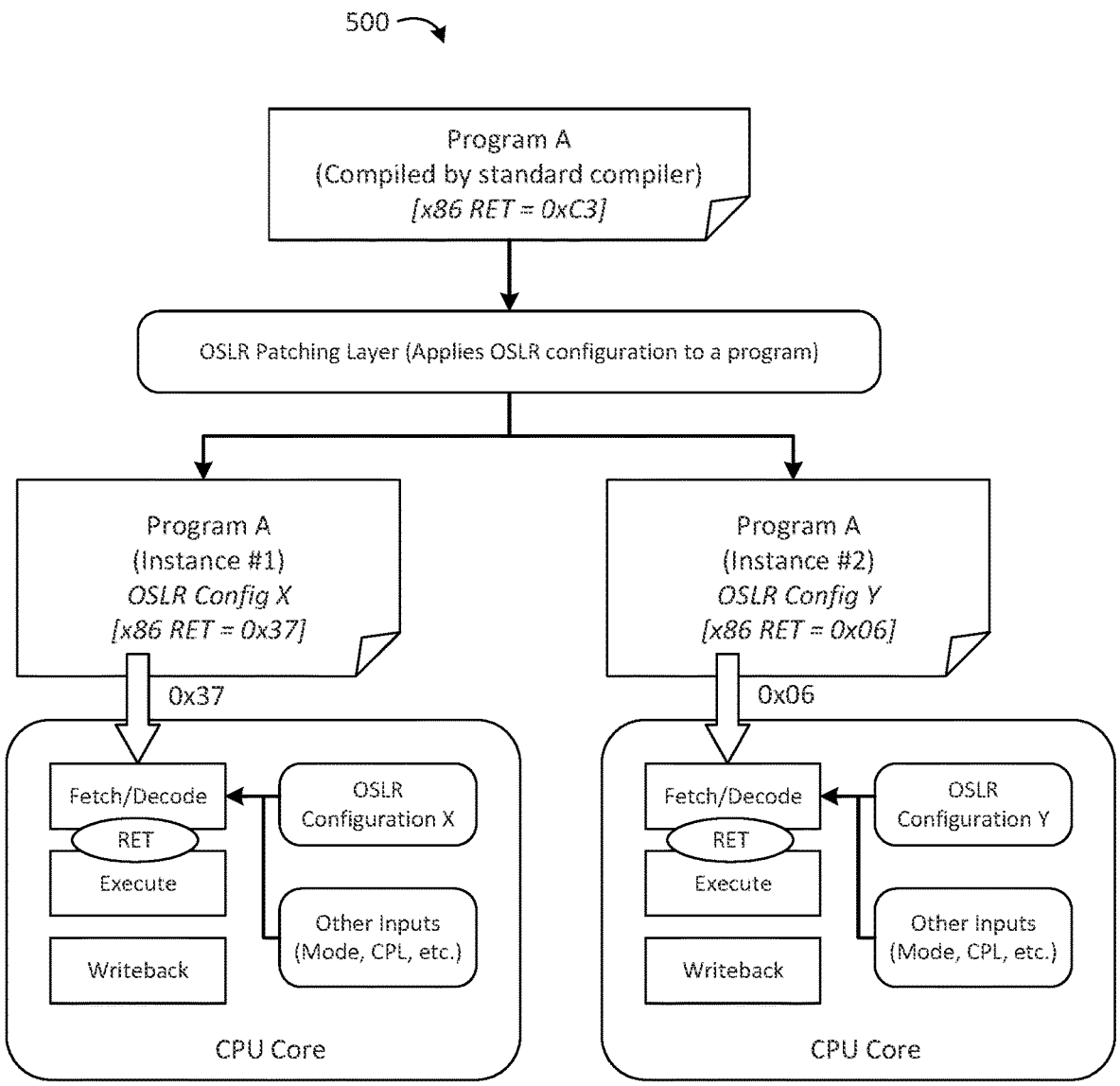
FIG. 5A is an illustrative diagram of an example of a process flow according to an embodiment.

With reference to FIG. 5A, an embodiment of a process flow 500 illustrates how a wildcard opcode may be applied to an example RET opcode. Using x86 as an example, a return instruction (RET) may have a standard original opcode of 0xC3. When Program A is compiled by a standard compiler, the RET instruction may be represented in the compiled code as "0xC3". At load time or run time, an OSLR patching layer may apply an OSLR configuration to Program A. The OSLR configuration may select the RET opcode as a wildcard opcode and randomly substitute another opcode value for the RET opcode (e.g., within a restricted set of random opcode values that do not conflict with non-mutable opcode values). In the illustrated example, for Instance #1 of Program A, the applied OLSR Config X may change the opcode value for the RET instruction to 0x37. For Instance #2 of Program A, the applied OLSR Config Y may change the opcode value for the RET instruction to 0x06. At load time or runtime, the decoder may load the appropriate OSLR configuration (e.g., as well as other inputs) to correctly decode the altered opcode value.

In another example, the CPU includes a decoder which allows for restricted OSLR for four (4) sensitive instructions including: Indirect CALL; Indirect JMP; Return; and END-BRANCH. Example OSLR Configuration Map settings may support programmable registers for holding mutable opcode selections, where each of the programmable registers is 64-bits, but the actual register content is subject to the existing "fixed" opcode lengths of each mutable instruction. The value held in the register is used at decode time to determine what byte pattern a program can use to convey the use of the particular corresponding instruction. In an example x86 Architecture, the original opcodes for the selected instructions are as follows:

INDIRECT_CALL_OPCODE=0x9A
INDIRECT_JMP_OPCODE=0xFF
RETURN_OPCODE=0xC3
ENDBRANCH_OPCODE=0xF30F1EFA

An example OSLR configuration (e.g., mutated to protect against attackers which assume the configuration above) may alter the opcodes for the selected instructions as follows:

OSLR_CONFIG_INDIRECT_CALL_OPCODE=0xD4
OSLR_CONFIG_INDIRECT_JMP_OPCODE=0xD5
OSLR_CONFIG_RETURN_OPCODE=0xCE
OSLR_CONFIG_ENDBRANCH_OPCODE=
0xF30F1EFB

These settings become part of the CPU context and are context-switched and preserved with the program that makes use of them. CPUs that support embodiments of OSLR may have these settings per logical processor, because programs running on different logical processors could (e.g., in parallel) make use of different OSLR configurations. For example, the OSLR registers (e.g., which may be model specific registers (MSRs)) become part of the "thread context block" managed by an operating system (OS) and/or virtual machine manager (VMM), and are automatically saved/restored as needed.

At load time, for the current example, a program would mutate its existing binary to adopt the new opcode byte patterns in accordance to the OSLR configuration. The mutation is a binary-to-binary transformation process that involves instruction decode and re-encode to perform the transformation and/or a patching map (e.g., meta-data) that provides pointers (e.g., references or relocations) to all instructions which require patching. Any suitable technology may be utilized to mutate all of the patchable instructions from their stock encodings to their corresponding mutated encodings. Additionally, embodiments may be used with statically compiled code and/or dynamically generated compiled code (e.g., just-in-time (JIT) compiled code, etc.).

Advantageously, embodiments of OSLR technology described herein allow for copies of the same program to use different OSLR configuration maps in order to increase the probability that an attack/exploit that seeks to tamper with the program fails, because the actual program representation is incompatible with the attacker's assumptions. Moreover, any attack which seeks to exploit program "gadgets" that once involved the standard ISA encodings of indirect CALL, indirect JMP, return, and ENDBRANCH are thwarted by the fact that the program representation doesn't match the attacker's expectations.

Figure 5B:
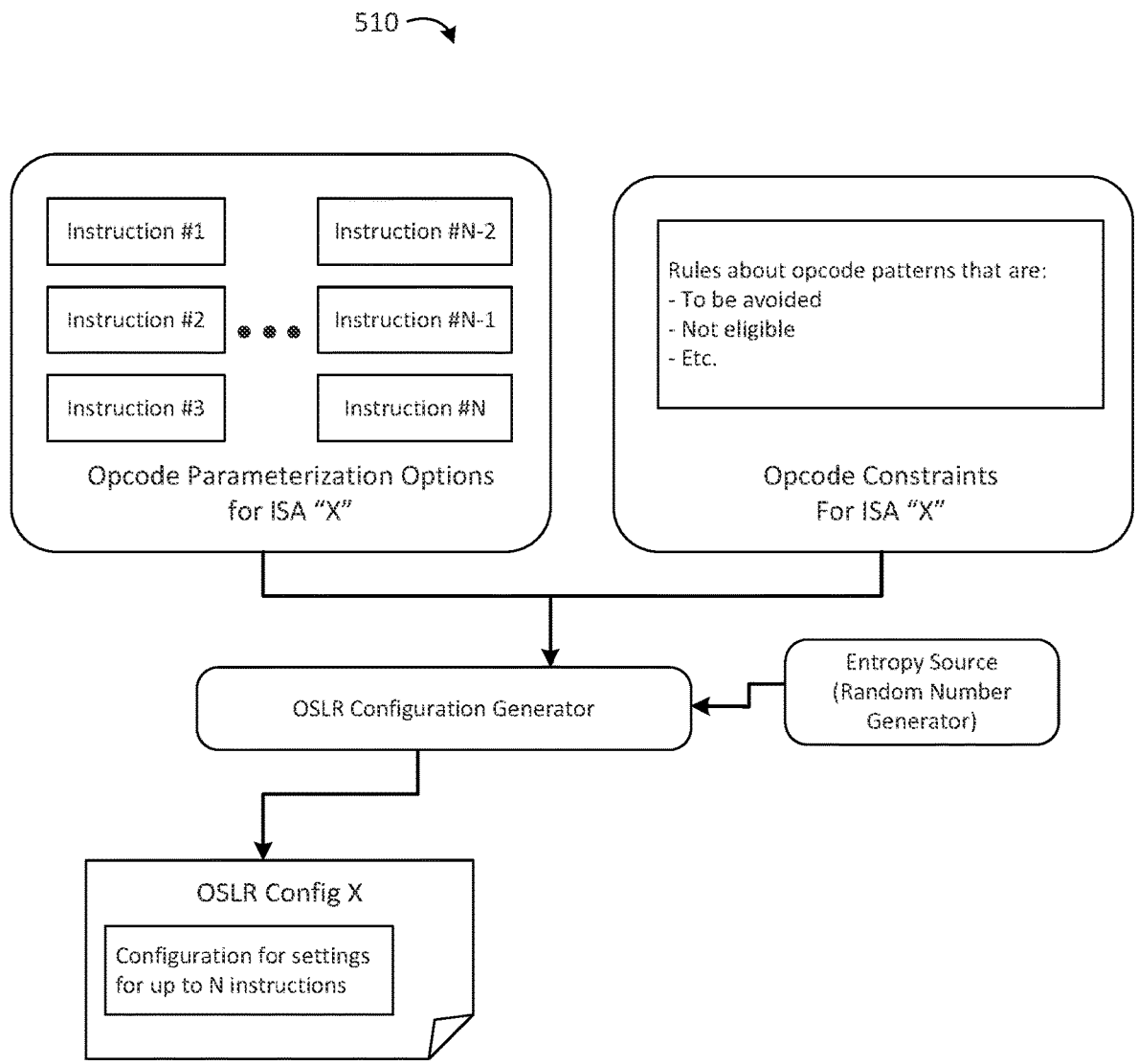
FIG. 5B is an illustrative diagram of another example of a process flow according to an embodiment.

With reference to FIG. 5B, an embodiment of a process flow 510 illustrates the process of building or generating a configuration (e.g., selecting random opcodes for up to N instructions). An entropy source (e.g., a random number generator) may be utilized to generate an effectively random set of opcodes to be used for a particular program's invocation, subject to the rules and constraints of a particular architecture (e.g., where a constraint may be that only certain M-byte opcodes are possibilities). For a CPU architecture that allows up to N instructions that can support opcode parameterization, the process flow 510 may generate up to N instruction opcode replacements, which are then used to override the default opcode behavior for those particular instructions. The generated information may be considered to be an instance of an OSLR configuration, and is used to re-program both the HW (decoder) and SW (program binary).

Figure 5C:
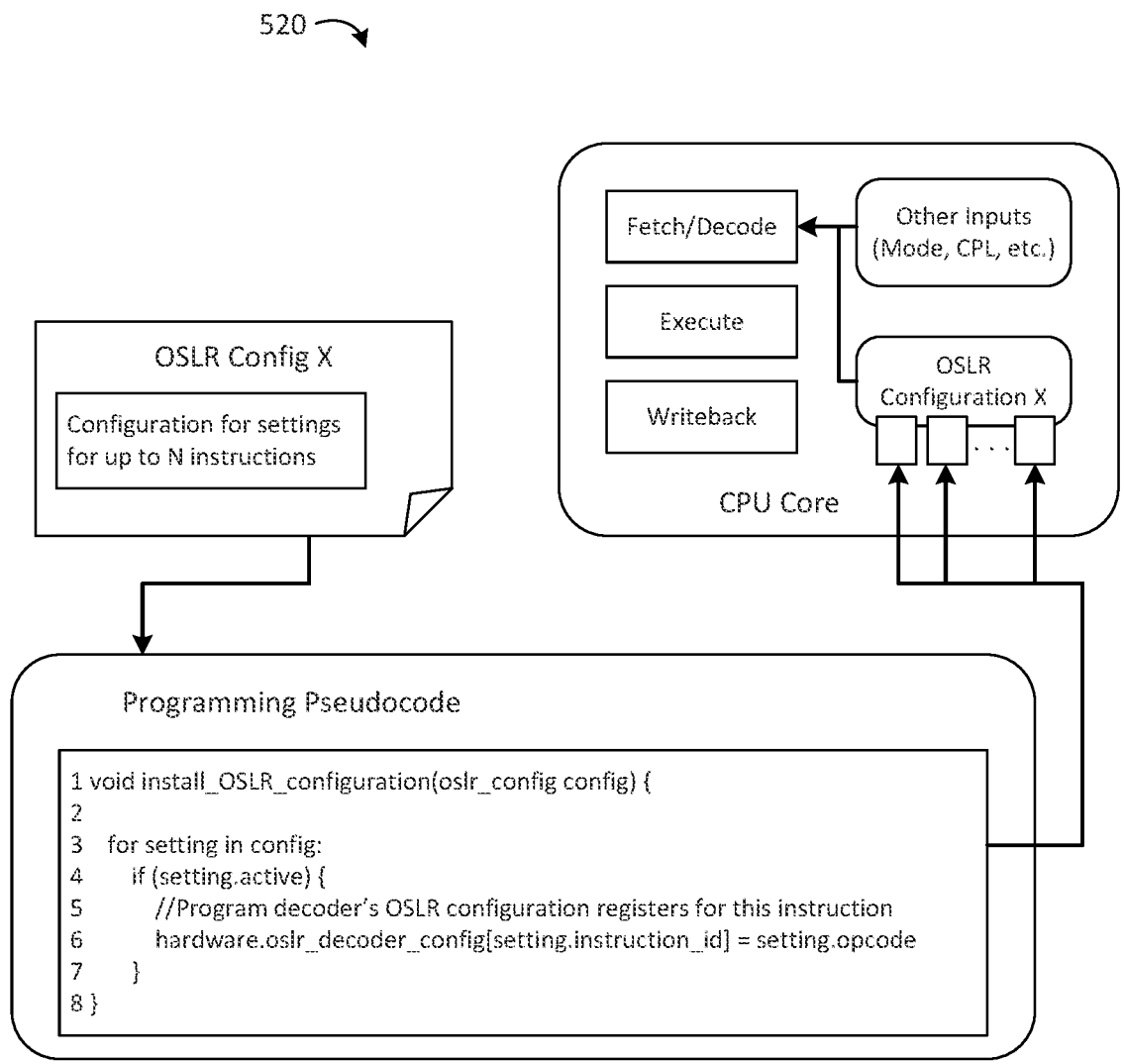
FIG. 5C is an illustrative diagram of another example of a process flow according to an embodiment.

With reference to FIG. 5C, an embodiment of a process flow 520 illustrates the process of installing an OSLR configuration (e.g., setting up the active configuration for a given CPU). As illustrated, the OSLR configuration is programmed into the HW of a particular CPU by setting the particular OSLR configuration registers in the decode logic of the CPU. For every instruction with a corresponding opcode that is going to be overridden, a set of register(s) will be programmed to indicate to the HW that: (a) this particular instruction will have its opcode overridden; and (b) the altered opcode for this instruction is a particular value (e.g., where the particular value comes from the OSLR configuration). After the OSLR configuration is installed, the OSLR-generated opcodes are interpreted by the CPU as the particular instruction that is being overridden.

Figure 5D:
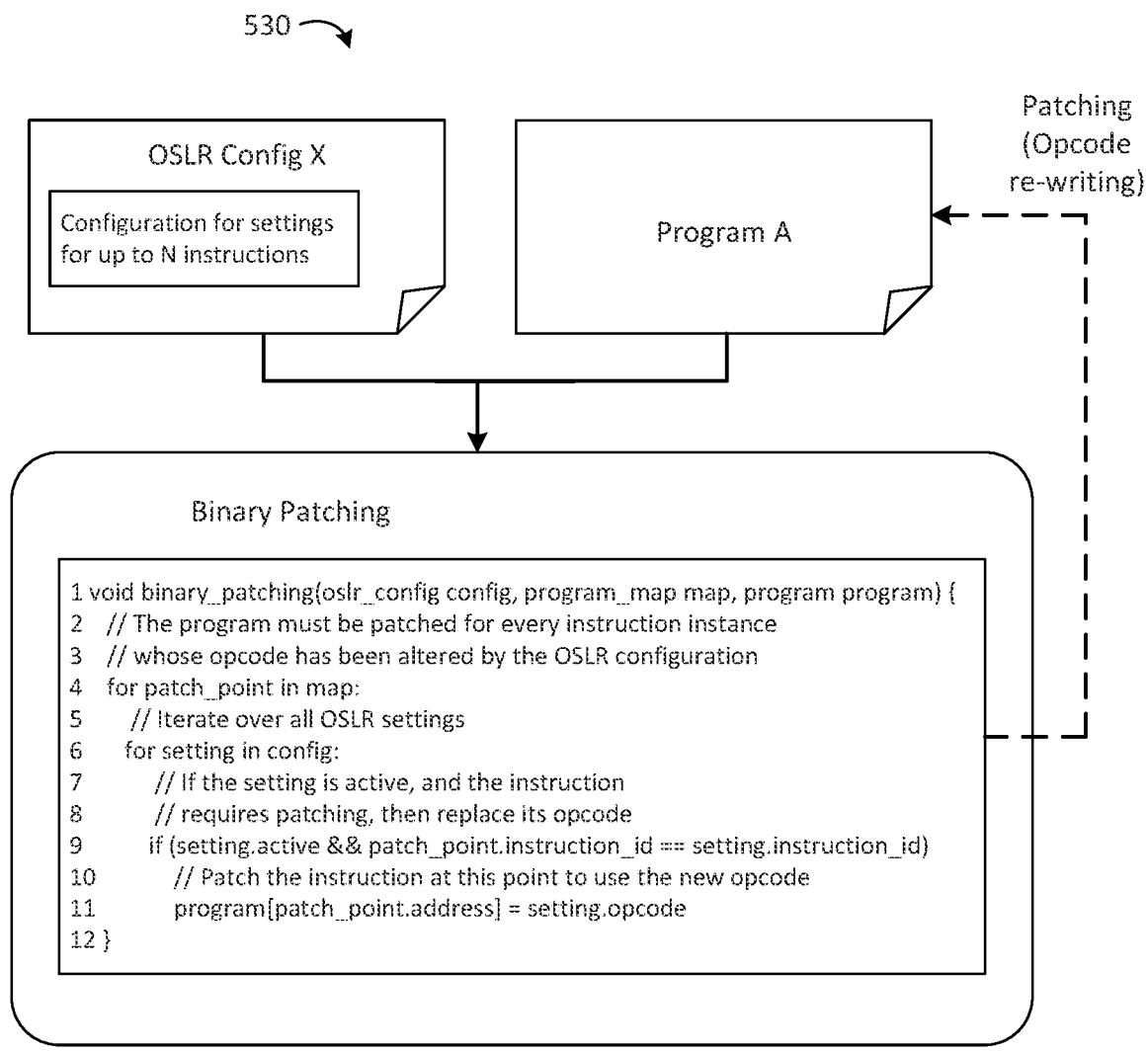
FIG. 5D is an illustrative diagram of another example of a process flow according to an embodiment.

With reference to FIG. 5D, an embodiment of a process flow 530 illustrates the process of patching and producing a SW binary with an OSLR configuration (e.g., making all necessary instructions use the OSLR specified opcodes). As illustrated, the process flow 530 takes an OSLR configuration and morphs a piece of software (Program A) in binary form to utilize the OSLR configuration. The morphing process is a patching process that re-writes the opcodes of all instructions with opcodes that are being overridden. Any suitable technology may be utilized for such patching. For example, two most straight-forward techniques include: 1) a full binary scan, where all overridden instructions are found and then patched with the new opcodes; and 2), as shown, a "map" is prepared with the binary that holds pointers to all potential patchable instruction types and the map is traversed in order to do patching without having to traverse the entire binary. While the map mechanism may be more efficient in terms of latency of doing the re-configuration process, it puts a slight burden on compilers/code-generators in producing the map itself.

Mutated programs may pose a slight challenge to some CPU/SW tooling infrastructure. For example, legitimate program debuggers may need to disassemble running programs. A debugger typically makes use of a fixed set of assumptions in its instruction decode logic. With OSLR, a debugger's decode logic must make use of an interface to discover the mutated instruction encodings. A legitimate or authorized debugger may accomplish this via reading the OSLR configuration for the running program, which may be maintained as privileged information that may be hidden from casual observers and attackers, but may be made available to legitimate/authorized agents/tools that require the information. For example, an opt-in/opt-out strategy in software may be used to protect this information in a similar way as to how privileged program state is not readily accessible to all agents for a particular program (e.g., MSR protections for sensitive information, etc.). A program which opts in to debug mode can allow this information to be viewed by qualified agents, whereas a program which opts-out can ensure that no agent is allowed to see this information.

For interoperability of mutated programs wherein two or more programs interact but use alternate OSLR configurations, the programs may be configured to "swap" OSLR configurations as control is transferred from one portion of the program to another. In some embodiments, specialized instructions in the architecture can be added to facilitate this swapping. Additionally, restrictions can be put into place (e.g., in HW, SW, or both) which limit the ability of OSLR-mutated programs to interact directly (e.g., or transfer control to) non-mutated programs, or programs which have different OSLR configurations. Dynamically, interoperability can be created by re-patching programs to have compatible OSLR maps (e.g., through meta-data, full program scanning, etc.).

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 6B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 7A:
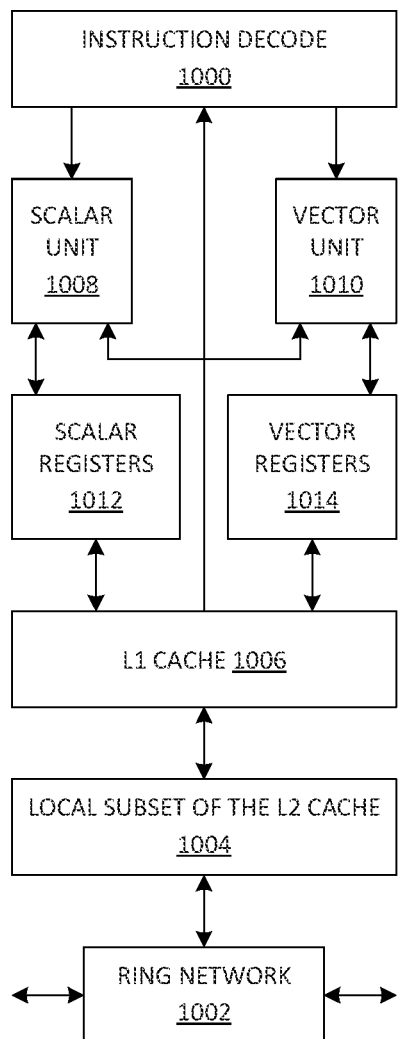
FIGS. 7A-B illustrate a block diagram of a more specific exemplary in-order core architecture, which core would be one of several logic blocks (including other cores of the same type and/or different types) in a chip.
Figure 7B:
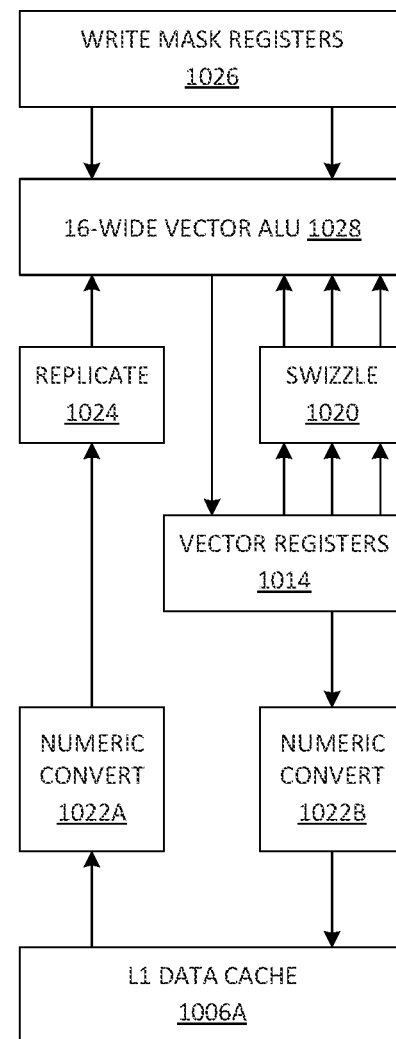

FIGS. 7A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 7A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 7B is an expanded view of part of the processor core in FIG. 7A according to embodiments of the invention. FIG. 7B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 8:
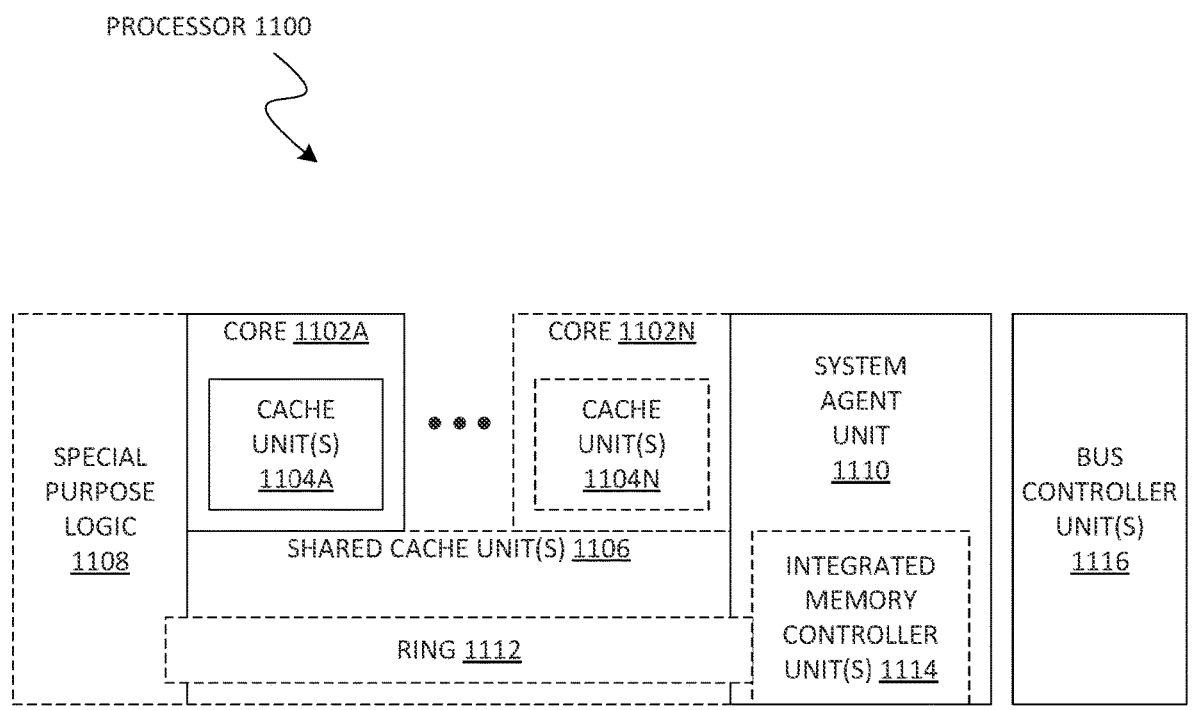
FIG. 8 is a block diagram of a processor that may have more than one core, may have an integrated memory controller, and may have integrated graphics according to embodiments of the invention.

FIG. 8 is a block diagram of a processor 1100 that may have more than one core, may have an integrated memory controller, and may have integrated graphics according to embodiments of the invention. The solid lined boxes in FIG. 8 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 9-12 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 9:
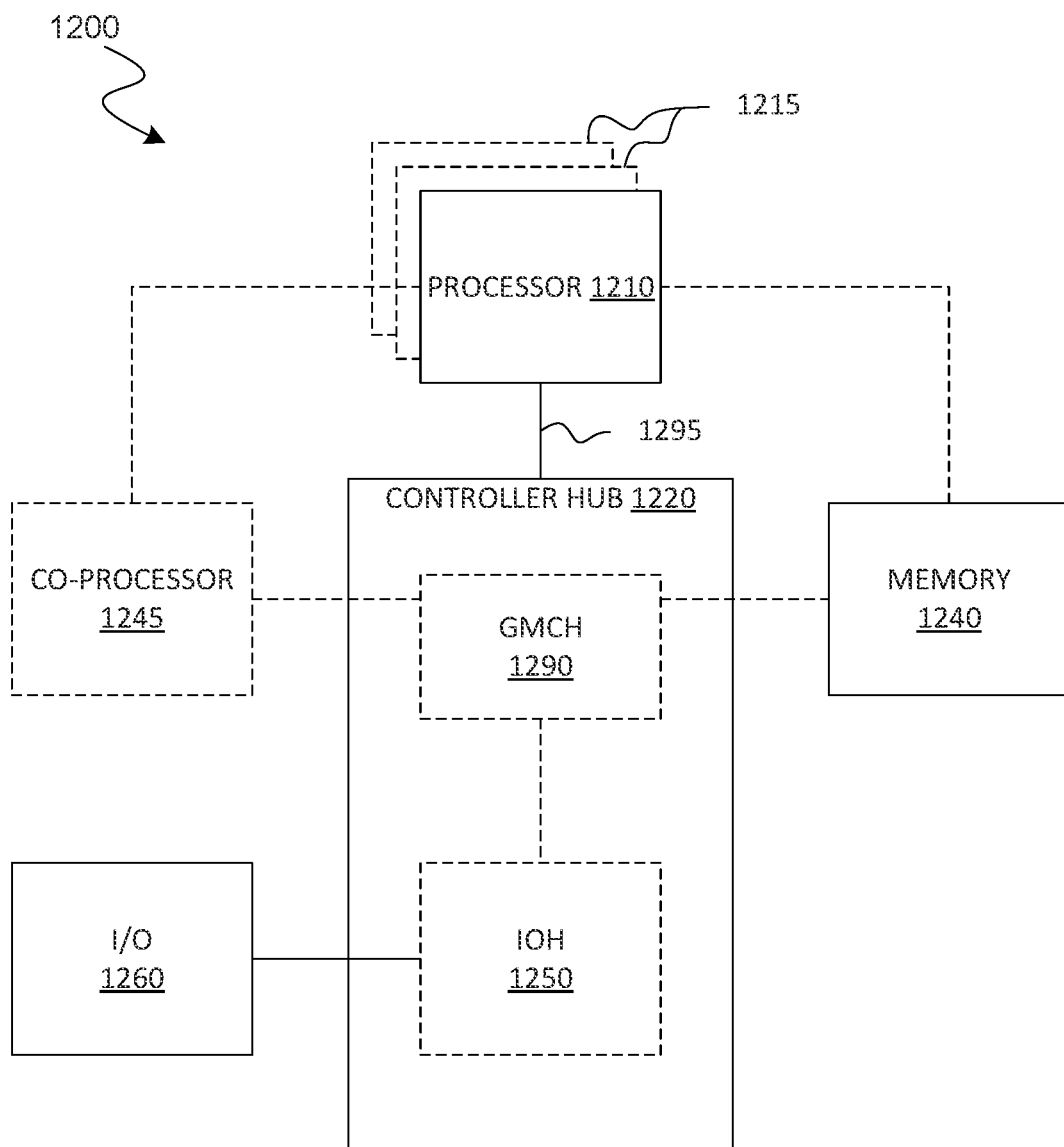
FIGS. 9-12 are block diagrams of exemplary computer architectures.

Referring now to FIG. 9, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 9 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 10:
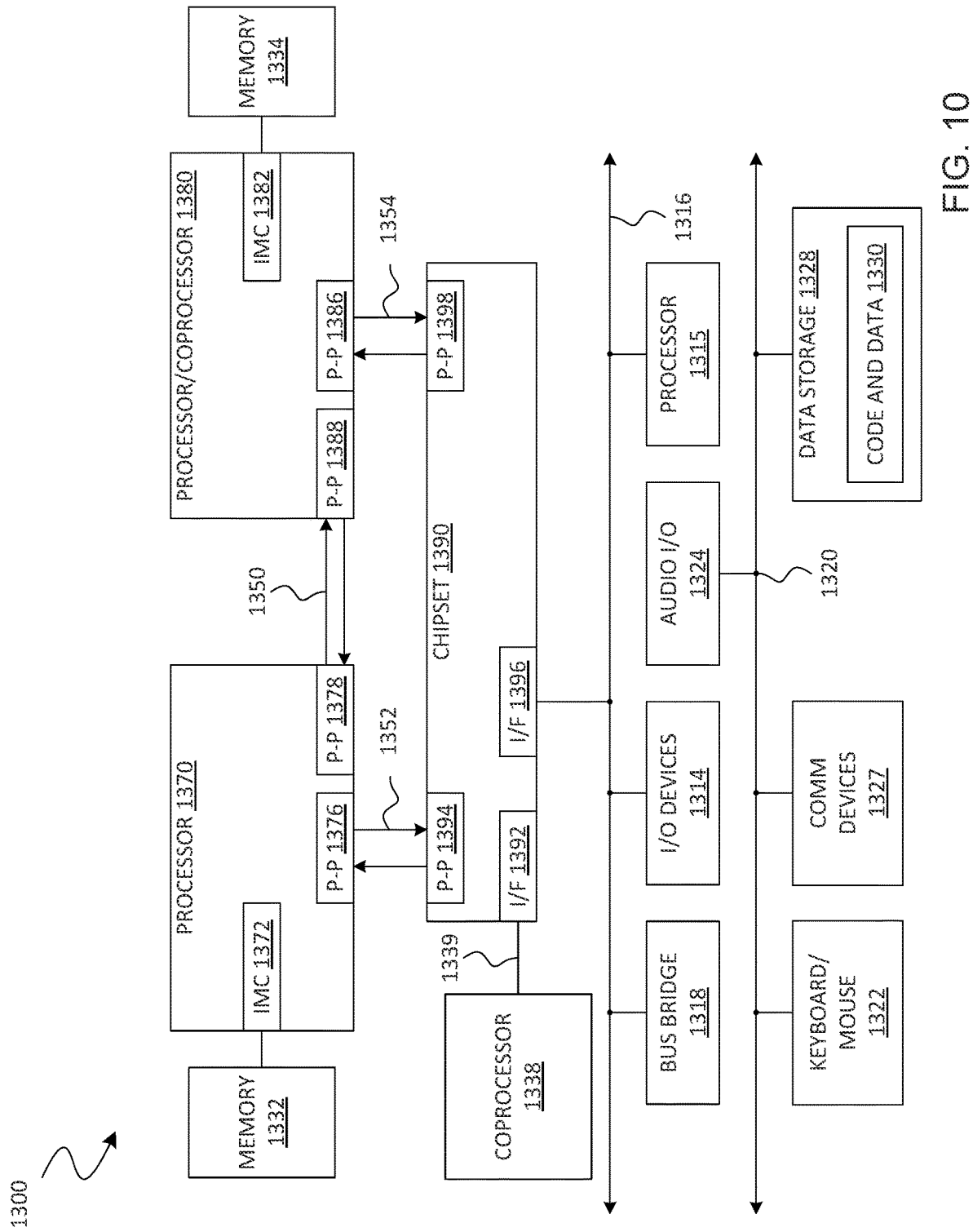

Referring now to FIG. 10, shown is a block diagram of a first more specific exemplary system 1300 in accordance with an embodiment of the present invention. As shown in FIG. 10, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 10, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 10, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 10, a system may implement a multi-drop bus or other such architecture.

Referring now to FIG. 11, shown is a block diagram of a second more specific exemplary system 1400 in accordance with an embodiment of the present invention Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processors 1370, 1380 may include integrated memory and I/O control logic ("CL") 1472 and 1482, respectively. Thus, the CL 1472, 1482 include integrated memory controller units and include I/O control logic. FIG. 11 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 12, shown is a block diagram of a SoC 1500 in accordance with an embodiment of the present invention. Similar elements in FIG. 8 bear like reference numerals. Also, dashed lined boxes are optional features on more advanced SoCs. In FIG. 12, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including binary translation, code morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 13 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Techniques and architectures for instruction set architecture opcode parameterization are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

ADDITIONAL NOTES AND EXAMPLES

Example 1 includes an apparatus, comprising memory to store configuration information, an instruction decoder to decode an instruction having one or more fields including an opcode field, and circuitry communicatively coupled to the instruction decoder and the memory, the circuitry to determine if an opcode value in the opcode field of the instruction corresponds to an altered opcode value in the stored configuration information that correlates one or more altered opcode values with respective original opcode values, and, if so determined, decode the instruction based on one of the original opcode values correlated to the altered opcode value in the stored configuration information.

Example 2 includes the apparatus of Example 1, wherein the circuitry is further to store random opcode values in the configuration information for the one or more altered opcode values, and correlate a respective original opcode value to each of the random opcode values in the stored configuration information.

Example 3 includes the apparatus of any of Examples 1 to 2, further comprising software to alter instruction-level encoded content of a program at load time to substitute altered opcode values for the correlated original opcode values from the stored configuration information.

Example 4 includes the apparatus of Example 3, wherein the software is further to add the configuration information to a context of the program to make the program and configuration information portable.

Example 5 includes the apparatus of Example 3, wherein the software is further to generate a first set of random opcode values in the configuration information for a first instance of the program, and generate a second set of random opcode values, different from the first set, in the configuration information for a second instance of the program.

Example 6 includes the apparatus of Example 5, wherein the software is further to restrict the random opcode values in the configuration information to values that avoid conflict with a pre-determined non-mutable instruction pattern.

Example 7 includes the apparatus of any of Examples 1 to 6, wherein the memory comprises one or more programmable system registers to store the configuration information.

Example 8 includes a method, comprising storing configuration information that correlates one or more altered opcode values with respective original opcode values in a programmable register coupled to a decoder, fetching an instruction having an opcode field, determining if an opcode value in the opcode field of the instruction corresponds to an altered opcode value in the stored configuration information, and, if so determined, decoding the instruction by the decoder based on one of the original opcode values correlated to the altered opcode value in the stored configuration information.

Example 9 includes the method of Example 8, further comprising storing random opcode values in the configuration information for the one or more altered opcode values, and correlating a respective original opcode value to each of the random opcode values in the stored configuration information.

Example 10 includes the method of any of Examples 8 to 9, further comprising altering instruction-level encoded content of a program at load time to substitute altered opcode values for the correlated original opcode values from the stored configuration information.

Example 11 includes the method of Example 10, further comprising adding the configuration information to a context of the program to make the program and configuration information portable.

Example 12 includes the method of Example 10, further comprising generating a first set of random opcode values in the configuration information for a first instance of the program, and generating a second set of random opcode values, different from the first set, in the configuration information for a second instance of the program.

Example 13 includes the method of Example 12, further comprising restricting the random opcode values in the configuration information to values that avoid conflict with a pre-determined non-mutable instruction pattern.

Example 14 includes an apparatus, comprising storage circuitry to store configuration information that correlates one or more altered opcode values with respective original opcode values, fetch circuitry to fetch a single instruction, the single instruction to include an opcode field, opcode alteration circuitry communicatively coupled to the storage circuitry and the fetch circuitry to determine if an opcode value in the opcode field of the single instruction corresponds to an altered opcode value in the stored configuration information and, if so determined, to substitute one of the original opcode values correlated to the altered opcode value in stored configuration information for the altered opcode value, decoder circuitry communicatively coupled to the opcode alteration circuitry to decode the single instruction based on the opcode value that results from the opcode alteration circuitry, and execution circuitry communicatively coupled to the decoder circuitry to execute the decoded instruction.

15 includes the apparatus of Example 14, further comprising configuration circuitry communicatively coupled to the storage circuitry to store random opcode values in the configuration information for the one or more altered opcode values, and correlate a respective original opcode values to each of the random opcode values in the stored configuration information.

Example 16 includes the apparatus of any of Examples 14 to 15, further comprising operating system code to alter instruction-level encoding content of a program at load time to substitute altered opcode values for the correlated original opcode values from the configuration information.

Example 17 includes the apparatus of Example 16, wherein the operating system code is further to add the configuration information to a context of the program to make the program and configuration information portable.

Example 18 includes the apparatus of Example 16, wherein the operating system code is further to generate a first set of random opcode values in the configuration information for a first instance of the program, and generate a second set of random opcode values, different from the first set, in the configuration information for a second instance of the program.

Example 19 includes the apparatus of Example 18, wherein the operating system code is further to restrict the random opcode values in the configuration information to values that avoid conflict with a pre-determined non-mutable instruction pattern.

Example 20 includes the apparatus of any of Examples 14 to 19, wherein the single instruction further includes a field for an identifier of a first source operand to identify one of a vector register and a memory location.

Example 21 includes an apparatus, comprising means for storing configuration information that correlates one or more altered opcode values with respective original opcode values in a programmable register coupled to a decoder, means for fetching an instruction having an opcode field, means for determining if an opcode value in the opcode field of the instruction corresponds to an altered opcode value in the stored configuration information, and, if so determined, means for decoding the instruction by the decoder based on one of the original opcode values correlated to the altered opcode value in the stored configuration information.

Example 22 includes the apparatus of Example 21, further comprising means for storing random opcode values in the configuration information for the one or more altered opcode values, and means for correlating a respective original opcode value to each of the random opcode values in the stored configuration information.

Example 23 includes the apparatus of any of Examples 21 to 22, further comprising means for altering instruction-level encoded content of a program at load time to substitute altered opcode values for the correlated original opcode values from the stored configuration information.

Example 24 includes the apparatus of Example 23, further comprising means for adding the configuration information to a context of the program to make the program and configuration information portable.

Example 25 includes the apparatus of Example 23, further comprising means for generating a first set of random opcode values in the configuration information for a first instance of the program, and means for generating a second set of random opcode values, different from the first set, in the configuration information for a second instance of the program.

Example 26 includes the apparatus of Example 25, further comprising means for restricting the random opcode values in the configuration information to values that avoid conflict with a pre-determined non-mutable instruction pattern.

Example 27 includes at least one non-transitory machine readable medium comprising a plurality of instructions that, in response to being executed on a computing device, cause the computing device to store configuration information that correlates one or more altered opcode values with respective original opcode values in a programmable register coupled to a decoder, fetch an instruction having an opcode field, determine if an opcode value in the opcode field of the instruction corresponds to an altered opcode value in the stored configuration information, and, if so determined, decode the instruction by the decoder based on one of the original opcode values correlated to the altered opcode value in the stored configuration information.

Example 28 includes the at least one non-transitory machine readable medium of Example 27, comprising a plurality of further instructions that, in response to being executed on the computing device, cause the computing device to store random opcode values in the configuration information for the one or more altered opcode values, and correlate a respective original opcode value to each of the random opcode values in the stored configuration information.

Example 29 includes the at least one non-transitory machine readable medium of any of Examples 27 to 28, comprising a plurality of further instructions that, in response to being executed on the computing device, cause the computing device to alter instruction-level encoded content of a program at load time to substitute altered opcode values for the correlated original opcode values from the stored configuration information.

Example 30 includes the at least one non-transitory machine readable medium of Example 29, comprising a plurality of further instructions that, in response to being executed on the computing device, cause the computing device to add the configuration information to a context of the program to make the program and configuration information portable.

Example 31 includes the at least one non-transitory machine readable medium of Example 29, comprising a plurality of further instructions that, in response to being executed on the computing device, cause the computing device to generate a first set of random opcode values in the configuration information for a first instance of the program, and generate a second set of random opcode values, different from the first set, in the configuration information for a second instance of the program.

Example 32 includes the at least one non-transitory machine readable medium of Example 31, comprising a plurality of further instructions that, in response to being executed on the computing device, cause the computing device to restrict the random opcode values in the configuration information to values that avoid conflict with a pre-determined non-mutable instruction pattern.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus, comprising:
   a memory;
   an instruction decoder to decode an instruction having one or more fields including an opcode field; and
   circuitry communicatively coupled to the instruction decoder and the memory, the circuitry to:
      provide at the memory configuration information that correlates one or more altered opcode values with respective original opcode values, comprising the circuitry to:
         store random opcode values for the one or more altered opcode values;
         correlate in the configuration information a respective original opcode value to each of the random opcode values; and
         restrict the random opcode values in the configuration information to values that avoid conflict with a pre-determined non-mutable instruction pattern;
      determine if an opcode value in the opcode field of the instruction corresponds to an altered opcode value in the stored configuration information that correlates one or more altered opcode values with respective original opcode values; and
      if so determined, decode the instruction based on one of the original opcode values correlated to the altered opcode value in the stored configuration information.

2. The apparatus of claim 1, further comprising:
   software to alter instruction-level encoded content of a program at load time to substitute altered opcode values for the correlated original opcode values from the stored configuration information.

3. The apparatus of claim 2, wherein the software is further to:
   add the configuration information to a context of the program to make the program and configuration information portable.

4. The apparatus of claim 2, wherein the software is further to:
   generate a first set of random opcode values in the configuration information for a first instance of the program; and
   generate a second set of random opcode values, different from the first set, in the configuration information for a second instance of the program.

5. The apparatus of claim 1, wherein the memory comprises:
   one or more programmable system registers to store the configuration information.

6. A method, comprising:
   providing configuration information that correlates one or more altered opcode values with respective original opcode values in a programmable register coupled to a decoder, comprising:
      storing random opcode values for the one or more altered opcode values;
      correlating in the configuration information a respective original opcode value to each of the random opcode values; and
      restricting the random opcode values in the configuration information to values that avoid conflict with a pre-determined non-mutable instruction pattern;
   fetching an instruction having an opcode field;
   determining if an opcode value in the opcode field of the instruction corresponds to an altered opcode value in the stored configuration information; and
   if so determined, decoding the instruction by the decoder based on one of the original opcode values correlated to the altered opcode value in the stored configuration information.

7. The method of claim 6, further comprising:
   altering instruction-level encoded content of a program at load time to substitute altered opcode values for the correlated original opcode values from the stored configuration information.

8. The method of claim 7, further comprising:
   adding the configuration information to a context of the program to make the program and configuration information portable.

9. The method of claim 7, further comprising:
   generating a first set of random opcode values in the configuration information for a first instance of the program; and
   generating a second set of random opcode values, different from the first set, in the configuration information for a second instance of the program.

10. An apparatus, comprising:
    storage circuitry to provide configuration information that correlates one or more altered opcode values with respective original opcode values, comprising the storage circuitry to:
       store random opcode values for the one or more altered opcode values;
       correlate in the configuration information a respective original opcode value to each of the random opcode values; and
       restrict the random opcode values in the configuration information to values that avoid conflict with a pre-determined non-mutable instruction pattern;

fetch circuitry to fetch a single instruction, the single instruction to include an opcode field;

opcode alteration circuitry communicatively coupled to the storage circuity and the fetch circuitry to determine if an opcode value in the opcode field of the single instruction corresponds to an altered opcode value in the stored configuration information and, if so determined, to substitute one of the original opcode values correlated to the altered opcode value in stored configuration information for the altered opcode value;

decoder circuitry communicatively coupled to the opcode alteration circuitry to decode the single instruction based on the opcode value that results from the opcode alteration circuitry; and execution circuitry communicatively coupled to the decoder circuitry to execute the decoded instruction.

11. The apparatus of claim 10, further comprising operating system code to:

alter instruction-level encoding content of a program at load time to substitute altered opcode values for the correlated original opcode values from the configuration information.

12. The apparatus of claim 11, wherein the operating system code is further to:

add the configuration information to a context of the program to make the program and configuration information portable.

13. The apparatus of claim 11, wherein the operating system code is further to:

generate a first set of random opcode values in the configuration information for a first instance of the program; and generate a second set of random opcode values, different from the first set, in the configuration information for a second instance of the program.

14. The apparatus of claim 10, wherein the single instruction further includes a field for an identifier of a first source operand to identify one of a vector register and a memory location.

* * * * *